June 12, 1928.
F. W. ANDREWS
1,673,219
METHOD OF SALVAGING TIRE CARCASSES
Filed April 22, 1927      2 Sheets-Sheet 1
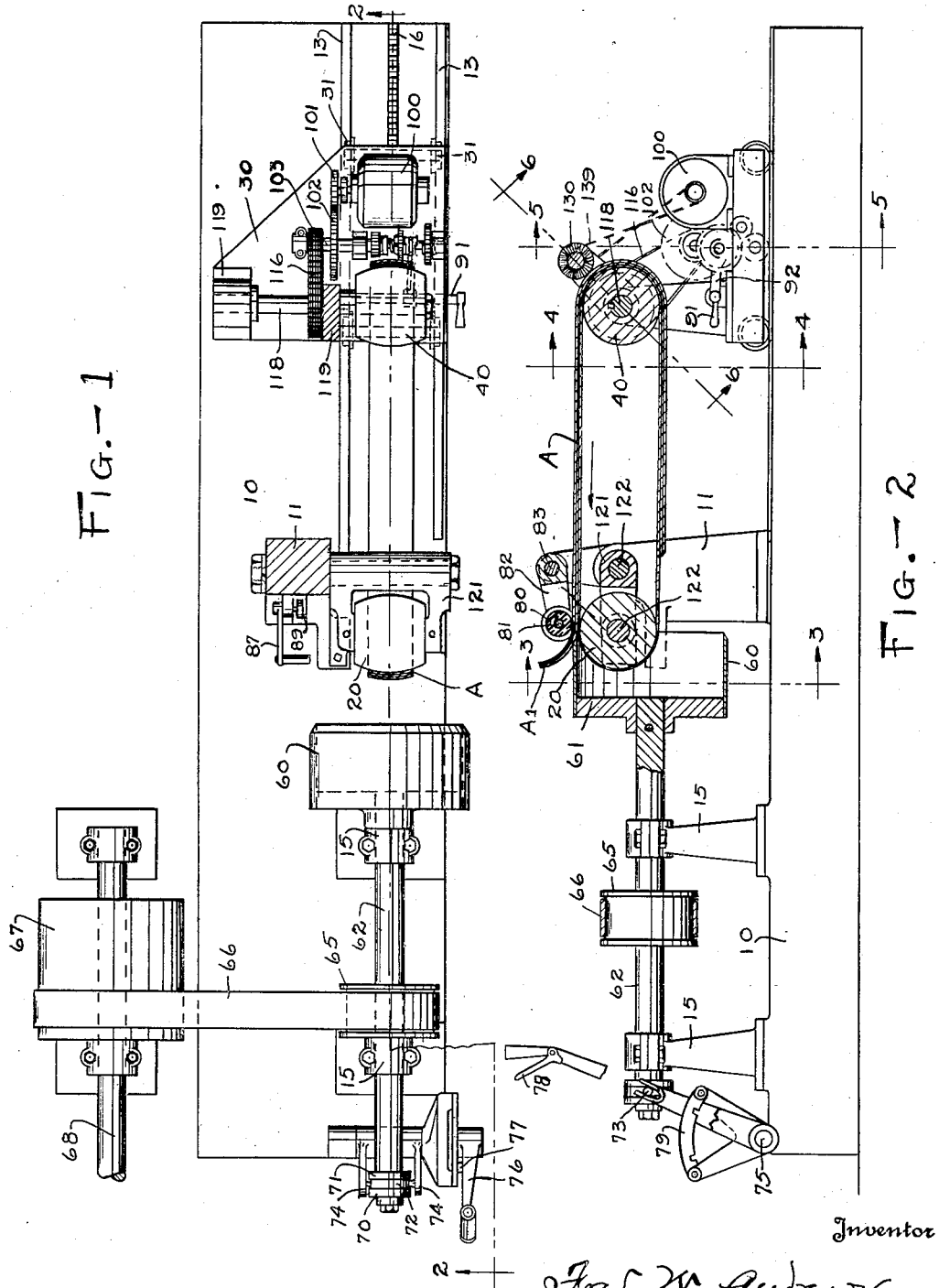
Inventor
Fred W. Andrews
By Baker, Maechler, Golrick & Tear,
Attorneys June 12, 1928.
F. W. ANDREWS
1,673,219
METHOD OF SALVAGING TIRE CARCASSES
Filed April 22, 1927   2 Sheets-Sheet 2
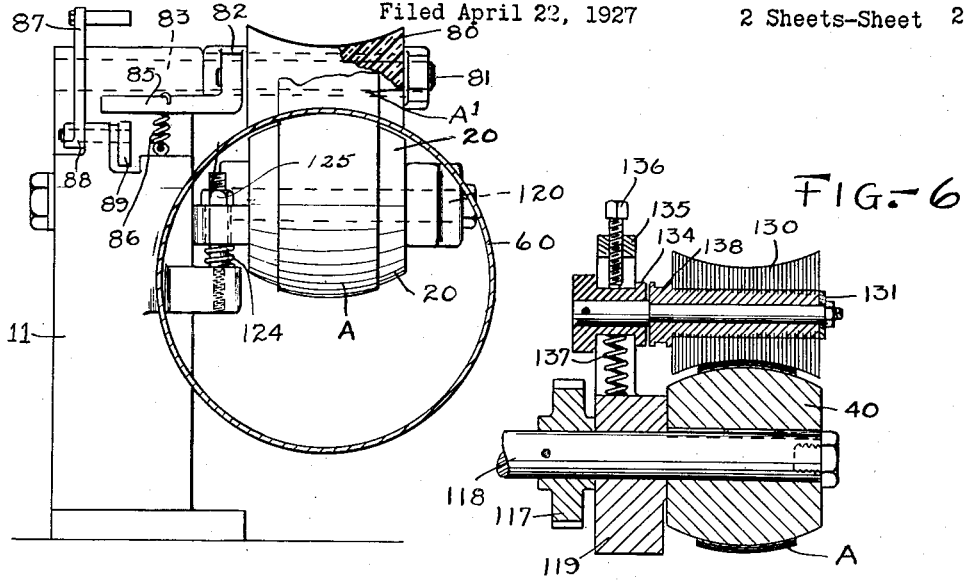
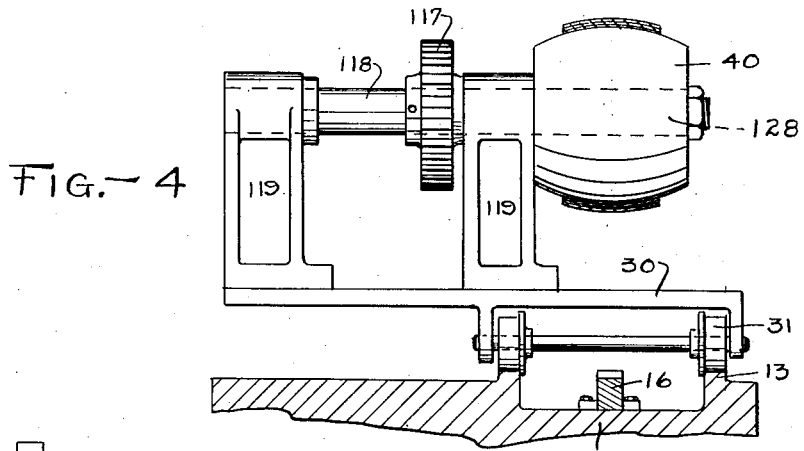
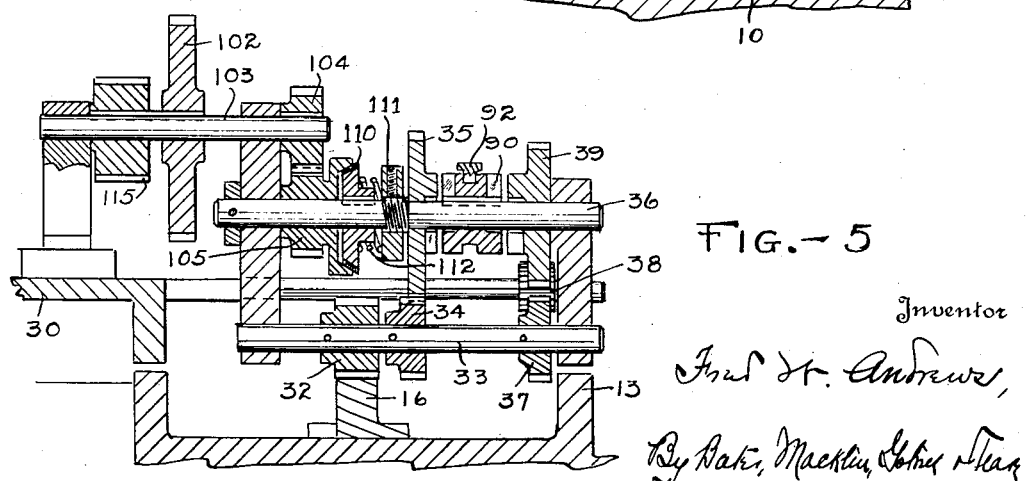

Patented June 12, 1928.

1,673,219

UNITED STATES PATENT OFFICE.

FRED W. ANDREWS, OF CLEVELAND, OHIO, ASSIGNOR TO REVALO PRODUCTS CORPORATION, A CORPORATION OF NEW YORK.

METHOD OF SALVAGING TIRE CARCASSES.

Application filed April 22, 1927. Serial No. 185,693.

Discarded automobile tires usually contain fabric which would be valuable for many uses if it could be cheaply recovered from the carcasses. It has been proposed to attach clamps to parts of the carcass and, by the application of great force, pull the carcass apart. Such operation has been comparatively slow and hence expensive and has not been satisfactory in the results obtained.

It is the object of this invention to provide a method of delaminating the carcass, and an apparatus for carrying out such method, which will be very rapid in operation and will result in salvaging the various layers of fabric without injury thereto.

To this end, I have provided for holding the tire carcass in a continuous loop and feeding it to a separating blade which travels crosswise of the carcass and thus splits the carcass between plies of fabric.

Suitable means provide a tension on the carcass loop and provide for continuously propelling the carcass and for operating the knife, which preferably travels continuously from one side of the carcass to the other so that there is no cessation in the separation operation.

In the preferred form, I mount the carcass loop on a pair of crowned rollers one of which is driven to propel the carcass after the manner of an endless belt, and I prefer to provide a knife in the form of an annular edge which has a radius of curvature approximately that of the crowning of the rollers so that the edge of the knife lies parallel with the crown of the cooperating roller.

My method will become clear from the following description of an apparatus for use in performing it, which is also included in my invention.

In the drawings, Fig. 1 is a plan of my apparatus partly in section; Fig. 2 is the vertical longitudinal section thereof as indicated by the line 2—2 on Fig. 1; Fig. 3 is a transverse section adjacent the cutting knife and forward roller, as indicated by the line 3—3 on Fig. 2; Fig. 4 is a transverse vertical section adjacent the other carrying roller and its shiftable mechanism, the plane being indicated by the line 4—4 on Fig. 2; Fig. 5 is a detail illustrating the tension mechanism and the shifting device of the rear roller, being a vertical section on the line 5—5 on Fig. 2; Fig. 6 is a detail illustrating a buffing brush, being a section on the line 6—6 on Fig. 2.

In Figs. 1 and 2, 10 indicates a suitable bed from which rises a standard 11, supporting the forward roller 20, and on which is a horizontal trackway 13 on which operates a carriage 30 supporting the rear roller 40. The rollers 20 and 40 are preferably crowned or convexed, as shown in Fig. 1, and the tire carcass to be delaminated, after having had its beads removed, is placed over these rollers as an endless belt, as shown at A in Fig. 2. The carriage 30 is provided with suitable means hereinafter described, for rotating the roller 40, and for giving it a tendency to move away from the roller 20 so that there is a constant tension on the carcass belt.

The carcass belt travels with its upper reach toward the front of the machine as indicated by the arrow in Fig. 2. Adjacent the front of the machine, in position to coact with the roller 20, is an annular stripping member or knife 60, which may be the rear edge of a hollow cylinder carried by a suitable disk 61. This disk is shown as mounted on a shaft 62 which is slidably and rotatably journalled in standards 15 rising from the bed. On the shaft 62 is shown a belt pulley 65 receiving a driving belt 66 from a drum 67 on a shaft 68 which is supported at the side of the machine and suitably driven by power not shown. This driving mechanism gives the annular knife a rapid rotation.

On the extreme forward end of the shaft 62 are shown a pair of collars 70 and 71 between which is freely journalled a ring 72 carrying trunnions 73 which engage in slots in rocker arms 74 on a rock shaft 75. On this rock shaft is an operating lever 76. This lever preferably carries a suitable locking pawl 77, operated by a hand grip 78 and cooperating with either of a pair of notches in a segment retaining bar 79. This provides an efficient device for locking the annular knife in its active position as shown in Fig. 2, or in its inactive position as shown in Fig. 1. The driving pulley 67 is preferably made broad to allow for the shifting of the belt 66 thereon, as the shaft 62 moves.

With the construction described, when the lever 76 is in its left hand position, as in Fig. 1, the knife is withdrawn from the roller 20. This roller and the roller 40, are so supported that the endless carcass belt may be readily slipped into place over them. This is effected by providing the supporting standards on one side only of the carcass belt, the rollers being mounted either on a stud projecting from such standard or carried by a yoke within the loop of the belt and itself supported by such standard.

The carcass is placed on the rollers while the knife 60 is distant from the roller 20 and while the roller 40 is somewhat nearer the roller 20 than its normal position. Then when the roller 40 has progressed toward the right, the carcass belt is stretched into the position shown. Now, when this roller 40 is driven at a comparatively slow speed, the carcass is forced against the knife, and the knife driven rapidly continuously across the carcass operates to split it between plies of fabric, the split-off portion curling up above the knife, as indicated in $A^1$ in Fig. 2.

To prevent any possibility of the intermediate region of the carcass belt bowing up when it engages the knife, I provide a soft rubber roller 80 concaved complementary to the roller 20 and mounted above it, so as to press down on the carcass belt just back of the knife. Being of soft rubber this roller adapts itself to the irregularities of the carcass, while a suitable spring gives it proper pressure against the roller 20.

As shown in Figs 1, 2 and 3, the roller 80 is mounted on a shaft 81 journalled in a yoke 82 which is journalled on a stud 83 projecting from the standard 11. The yoke 82 has a suitable tongue 85 to which is attached a spring 86 drawing the roller 80 toward the roller 20. To move the roller 80 to idle position and to there hold it for installing the belt, I have shown a hand lever 87 operating a rock shaft 88 which carries a cam 89 adapted to engage the tongue 85 and raise the yoke.

In order to shift the roller 40 conveniently, for placing and removing the fabric, and also for keeping a tension thereon during operation, I may provide the mechanism shown in Fig. 5 which will now be described. This is to say, the carriage 30 has wheels 31, engaging the bed tracks 13. Between these tracks is an upwardly facing stationary rack 16 carried by the bed. The carriage has a pinion 32 meshing with this rack. This pinion is shown as mounted on a transverse shaft 33. Tight in this shaft is a gear 34. Meshing with this gear 34 is a gear 35 loose on a shaft 36. The shaft 33 carries also a gear 37 meshing with an idler 38 which meshes with the gear 39 also loose on the shaft 36. This provides for driving the carriage in either direction according to whether the gear 35 or the gear 39 be driven. Splined on the shaft 36 is a shiftable clutch collar 90 adapted to engage either gear 35 or 39 according to the position of the clutch collar. A shift rod 91 and an arm 92, or other suitable means, provide for setting the clutch collar as desired.

It will be understood from the above description that rotation of the shaft 36 may result in propelling the carriage in either direction as desired. Power for so rotating it to move the carriage is derived from a motor 100 mounted on the carriage. This motor is shown as having a pinion 101 on its armature shaft, meshing with the gear 102 on a shaft 103. This shaft is shown as carrying a pinion 104, meshing with a pinion 105 on the shaft 36, which may drive that shaft. However, the driving is not positive but is through a constantly acting friction clutch 110.

When there is no load on the carriage, there is no material retardation against its movement, and the friction clutch maintains a substantially positive connection between the gear 105 loose on the shaft 36 and the collar 111 tight on that shaft.

Thus, the carriage is propelled in one direction or the other according to the position of the shipper rod 91. However, during operation, the propulsion of the carriage away from the knife and roller 20, soon produces a tension in the carcass belt of greater retarding force than the frictional binding of the clutch 110, so that thereafter the clutch slips.

The simple mechanism desired enables the shifting of the carriage in or out as desired, to enable the belt to be positioned thereon or freed therefrom, and also provides for constantly maintaining a tension on the belt, the amount of which is regulated by the friction on the clutch. By suitably adjusting the clutch, as for instance by shifting the collar 111 to change the pressure of the spring 112, one is able to change the tension on the carcass belt, as desired.

The same motor 100 which operates the carriage and produces the tension on the belt may also operate to drive the belt. Thus, as shown, the shaft 103 carries a sprocket wheel 115 which is connected by a silent chain 116 to the sprocket wheel 117 on the shaft 118 carrying the roller 40. This shaft being mounted on suitable standards 119 on the carriage.

It is desirable to provide means to buff the carcass belt as each ply of fabric is removed, thus removing the rubber which adheres on top of the exposed remainder of the belt. Figs. 2 and 6 illustrate a simple device for accomplishing this, comprising a metallic buffing brush 130 bearing against the carcass belt opposite the roller 40 and rotated rapidly so as to engage the belt in the opposite direction to its travel. I have shown this buffing wheel as journalled on a stud 131, which is carried in a block 134 slidably mounted in ways in an extension 135 of one of the standards 119. A set screw 136 bearing against the block in opposition to a spring 137 may force the brush with the desired degree of pressure against the carcass belt. A pulley 138 connected with the buffing brush carries a belt 139 leading from a pulley on the armature shaft of the motor 100, so that the same motor operates the buffing brush.

The buffing brush not only removes the surplus rubber from the fabric, but, as it is traveling against the same in the opposite direction to the travel of the belt, acts to increase the tension on the upper reach of the bolt, tending to keep it snug on its supporting rollers throughout its width.

An adjustment is provided on the roller 20 relative to the knife, to determine the thickness of the material stripped off. I have shown this as effected by journalling the roller 20 on a shaft 120, which is mounted in a yoke 121, pivoted at 122 on the standard 11 rising from the bed. Suitable means, as for instance, a spring 124 and a nut 125, serve to raise and lower this yoke so that the highest region of the crowned roller 20 may be presented to the adjacent edge of the knife 60. By this means, the desired space is provided between the roller and knife, as illustrated particularly in Fig. 3, this space being adjusted from time to time because as many or as few plies of fabric as desired to be stripped from the carcass.

The speed of operation varies with the kind and size of the tire and with the sharpness of the knife. By way of rough illustration, I may say that I have obtained good results by causing the knife edge to travel across the fabric at a speed of about 200 times that of the movement of the carcass toward the knife.

It will be seen from the mechanism described that this method of delaminating tires enables the delamination to be effected rapidly, and requires no preceding treatment of the carcass other than to remove the beads. Furthermore, it adapts itself to such adjustment as will enable one or more plies to be removed at a time, as desired.

I claim:

1. The method of salvaging tire carcasses which comprises removing the bead structures of a carcass tire, tensioning the remaining annulus whereby the cross-section of the annulus band approximates a flattened arc relative to the original arcuate cross sectional shape of the tire and severing the tread portion of the carcass from the fabric portion thereof along an arcuate line substantially parallel to the flattened arcuate inner cross-sectional line of the fabric of the carcass.

2. The method of salvaging tire carcasses which comprises removing the bead structures of a tire carcass, stretching the remaining annulus into an elongated band whereby the transverse cross-section of the band approximates a flattened arcuate structure relative to the original cross-sectional shape of the tire carcass and severing the tread rubber from the carcass fabric by cutting in an arcuate path which is transverse to the elongated marginal edges of the carcass.

3. The method of salvaging tire carcasses which comprises flattening a portion of the annulus band whereby the cross-section of the flattened portion approximates a flattened arc relative to the original arcuate cross-sectional shape of the tire and separating the several laminations of material comprising the carcass by cutting along an arcuate line substantially parallel to said flattened arcuate cross-sectional shape of the carcass.

4. The method of salvaging tire carcasses which comprises stretching the tire into an elongated band, propelling such band and severing one portion of the carcass from another by cutting cross-wise of the band from one edge to the other.

5. The method of salvaging tire carcasses which comprises stretching the tire into an elongated band and continuously feeding it toward a cutting knife traveling crosswise of the band, which thus cuts the rubber between plies of fabric and thereby splits such plies apart, and buffing an exposed fabric layer to remove the surplus rubber.

In testimony whereof, I hereunto affix my signature.

FRED W. ANDREWS.